(12) United States Patent
Thoukydides

(10) Patent No.: US 9,226,311 B2
(45) Date of Patent: *Dec. 29, 2015

(54) UWB COEXISTENCE SCHEME

(71) Applicant: QUALCOMM TECHNOLOGIES INTERNATIONAL, LTD., Cambridge (GB)

(72) Inventor: Alexander Thoukydides, Cambridge (GB)

(73) Assignee: Qualcomm Technologies International, LTD., Cambridge (GB)

( * ) Notice: Subject to any disclaimer, the term of this patent is extended or adjusted under 35 U.S.C. 154(b) by 66 days.

This patent is subject to a terminal disclaimer.

(21) Appl. No.: 14/230,666

(22) Filed: Mar. 31, 2014

(65) Prior Publication Data

US 2014/0211720 A1 Jul. 31, 2014

Related U.S. Application Data

(63) Continuation of application No. 12/537,833, filed on Aug. 7, 2009, now Pat. No. 8,730,927.

(30) Foreign Application Priority Data

Aug. 7, 2008 (GB) .................................. 0814483.4

(51) Int. Cl.
*H04W 72/12* (2009.01)
*H04B 1/403* (2015.01)
*H04B 15/02* (2006.01)
*H04W 88/06* (2009.01)
*H04W 16/14* (2009.01)

(52) U.S. Cl.
CPC ........... *H04W 72/1215* (2013.01); *H04B 1/406* (2013.01); *H04B 15/02* (2013.01); *H04W 88/06* (2013.01); *H04W 16/14* (2013.01)

(58) Field of Classification Search
USPC .............. 370/338, 343; 455/41.2, 63.1, 553.1
See application file for complete search history.

(56) References Cited

U.S. PATENT DOCUMENTS

| 2004/0259589 A1 | 12/2004 | Bahl et al. |
| 2008/0062919 A1* | 3/2008 | Chen et al. .................... 370/329 |
| 2009/0147763 A1 | 6/2009 | Desai et al. |

OTHER PUBLICATIONS

Bluetooth SIG (Jul. 26, 2007). Specification of the Bluetooth System [Online]. 1420 pp. URL http://www.bluetooth.com/NR/rdonlyres/F8E8276A-3898-4EC6-B7DA-5535258B056/ 6545/Core.
ECMA International, 2nd ed. Dec. 2007, High Rate Ultra Wideband PHY and MAC Standard [Online]. 344 pp. URL: http://www.ecma-internationaLorg/publications/files/ECMA-ST/ECMA-368.
(Continued)

*Primary Examiner* — Thai Nguyen
(74) *Attorney, Agent, or Firm* — Mahamedi Paradice LLP

(57) ABSTRACT

Roughly described, a first radio is configured to operate according to a first protocol and configured to use a coexistence signaling scheme with a second radio configured to operate according to a second protocol, wherein the coexistence signaling scheme is configured to allow a radio configured to operate according to the second protocol to be co-located and non-interfering with a radio configured to operate according to a protocol different to the first protocol, and wherein the first radio comprises behavioral logic for generating messages for the second radio in accordance with the coexistence signaling scheme to cause the second radio to adopt behavior suitable for coexistence with the first radio.

16 Claims, 3 Drawing Sheets

(56) References Cited

OTHER PUBLICATIONS

ECMA International, 3rd ed. Dec. 2008, High Rate Ultra Wideband PHY and MAC Standard [Online]. 344 pp. URL: http://www.ecma-internationaLorg/publications/files/ECMA-ST/ECMA-368.

IEEE, Jun. 12, 2007, IEEE Std 802.11.—2007 Edition [Online]. 1232 pp.

IEEE, Jun. 27, 2003, IEEE Std 802.11gTM—2003 [Online]. 78 pp (URL http://standards.ieee.org/getieee802/download/802.11g-2003.pdf).

IEEE, reaffirmed Jun. 12, 2003, IEEE Std 802.11a—1999 Edition [Online]. 91 pp (URL http://standards.ieee.org/getieee802/download/802.11a-1999.pdf).

* cited by examiner

UWB COEXISTENCE SCHEME

BACKGROUND

This invention relates to communication in environments where interference from signals relating to one communication protocol can hinder the reception of signals relating to another communication protocol.

One example of such an environment is when transceivers for two protocols that occupy the same or adjacent frequency bands are located close to each other or even in the same device: for instance a handheld communication device. As an example, a transceiver for IEEE 802.11a/j wireless LAN (local area network) signals could be located near to or in the same device as a transceiver for Ultra-Wideband (UWB) signals. Some combinations of IEEE 802.11a/j and Ultra-Wideband channels, even those that only partially overlap in frequency bandwidth, resulting in mutual interference between the two protocols. Because of this mutual interference it is desirable to adopt a coexistence scheme that enhances the ability of a receiver for one of those protocols to operate in the presence of interference from signals of the other protocol.

The IEEE 802.11 standard is defined in the following documents, among others: IEEE Computer Society, IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Std 802.11™—2007 (Jun. 12, 2007); IEEE Computer Society, Supplement to IEEE Standard for Information technology—Telecommunications and information exchange between Systems—Local and metropolitan area networks—Specific requirement—Part 11: Wireless LAN Medium Access Control (MAC) and Physical Layer (PHY) specifications—High-speed Physical Layer in the 5 GHz Band, IEEE Std 802.11a-1999(R2003) (Jun. 12, 2003); and IEEE Computer Society, IEEE Standard for Information technology—Telecommunications and information—exchange between systems—Local and metropolitan area networks—Specific requirements—Part 11: Wireless LAN Medium Access Control (MAC) and Physical Layer (PHY) specifications—Amendment 4: Further Higher Data Rate Extension in the 2.4 GHz Band, IEEE Std 802.11g™-2003 (Jun. 27, 2003). All these documents are incorporated herein by reference. As used herein, an IEEE 802.11 radio, transceiver or protocol is a radio, transceiver or protocol that conforms in relevant respects to the 2007 standard above, whether or not it also conforms to either 2003 standard above or any other version of the IEEE 802.11 standard.

There are many known coexistence schemes that allow Bluetooth and IEEE 802.11 to coexist. These include the 2-wire and 3-wire de-facto industry standard coexistence signaling systems, described by documents. The 3-wire standard is shown in PCT applications WO/2006/090242 and WO/2006/090254. However, these coexistence schemes were designed to operate with Bluetooth and cannot simply be used with a UWB radio to allow UWB and IEEE 802.11 to coexist as the nature of UWB transmission and reception is different to that of Bluetooth. Therefore, there is a need for a method of allowing a UWB radio to be used with existing Bluetooth coexistence enabled IEEE 802.11 hardware.

The Bluetooth standard is defined in Bluetooth SIG, Specification of the Bluetooth System, v2.1+EDR (Jul. 26, 2007), incorporated herein by reference. As used herein, a Bluetooth radio, transaction, slot or protocol is a radio, transaction, slot or protocol which conforms in relevant respects to this specification, whether or not it also conforms to other versions of such specification.

An IEEE 802.11 radio operates on a frequency-static channel that can be on one of 14 channels within the range 2400-2480 MHz for IEEE 802.11b/g (same as Bluetooth) or on one of many channels within the range 4900-5850 MHz for IEEE 802.11a/j. The effect of the two radios on each other's operation will depend on the degree to which their channels are separated by frequency difference between their channels and the relative strength of each signal. The closer the channels are, the greater the interference and the stronger one signal is, the more the other signal will suffer from interference.

The UWB specification is defined by the WiMedia Alliance MultiBand OFDM Physical Later Specification or 'ECMA-368'. It is defined in ECMA International, High Rate Ultra Wideband PHY and MAC Standard, 3rd ed. (December 2008) and in ECMA International, High Rate Ultra Wideband PHY and MAC Standard, 2nd ed. (December 2007), both of which are incorporated by reference herein. As used herein, the term Ultra-wideband radio, transceiver, protocol, beacon, reservation, transmission, preamble or activity is any radio, transceiver, protocol, beacon, reservation, transmission, preamble or activity that conforms to the relevant aspects of the ECMA-368 specification, $2^{nd}$ edition, whether or not it also conforms to the $3^{rd}$ edition or any subsequent revision of that specification.

ECMA-368 defines 6 Band Groups within which the UWB radio can operate; Band Group 1 defines a frequency bandwidth of between 3168 MHz and 4752 MHz, Band Group 2 defines a bandwidth of between 4752 MHz and 6336 MHz, Band Group 3 defines a bandwidth of between 6336 MHz and 7920 MHz, Band Group 4 defines a bandwidth of between 7920 MHz and 9504 MHz, and Band Group 5 defines a bandwidth of between 9504 MHz and 10560 MHz. Band Group 6 operates between 7392 MHz and 8976 MHz, i.e. it overlaps Band Groups 3 and 4.

Current UWB devices are Band Group 1, but future UWB devices used as higher-speed radios for Bluetooth will use frequencies above 6 GHz, due to concerns from cellular phone companies that UWB would interfere with WiMAX or other cellular radios. The Bluetooth SIG are mandating operation above 6 GHz, but some devices may continue using Band Group 1 due to either performance or compatibility reasons.

Due to both regulatory constraints and those from other organisations (such as the WiMedia Alliance and the Bluetooth SIG), any particular selection of intercommunicating UWB radios are unlikely to have any choice regarding the Band Group that they respectively use. There will usually be a choice of Band Group for new connections, although it will often be limited. However, if there is a pre-existing beacon group then new devices will often adopt its channel (Band Group and hopping sequence) rather than selecting their own. They may, however, have an option to select the hopping sequence—where one of the options is to stay on a single band (at a lower power level) rather than spreading the signal across three bands. There are also hopping sequences that use any two of the three bands in a Band Group.

In the case of a UWB receiver using Band Group 1, as an example, a greater than +5 dBm IEEE 802.11b/g signal might prevent UWB reception, as might a greater than −12 dBm IEEE 802.11a signal. Assuming 20 dB antenna isolation between the UWB and IEEE 802.11 antennas and a 20 dBm IEEE 802.11 output power this would mean that an IEEE 802.11b/g transmitter would not cause interference problems for the UWB receiver unit but an IEEE 802.11a transmitter would block the UWB receiver from receiving. A Band Group 2 UWB radio would suffer even worse from IEEE 802.11a transmissions. On the other hand, a Band Group 5 radio would be unlikely to have any problems.

FIG. 1 shows a hardware arrangement according to the prior art which uses more than one radio protocol. The system comprises a transceiver 1 for sending and receiving signals according to a first radio protocol and transceiver 2 for sending and receiving signals according to a second radio protocol. The transceiver 1 and transceiver 2 are co-located in a device 100.

In FIG. 1, the first radio protocol is IEEE 802.11 and the second radio protocol is Bluetooth. In the Bluetooth protocol, the timings of transmission of signals by the transmitter 2 can be influenced and varied during operation.

Transceiver 1 and transceiver 2 are connected using a '2-wire' coexistence scheme. This consists of two single bit data means 3 and 4, which allow transceivers 1 and 2 to exchange data regarding their respective current transmission and reception activities. By enforcing a set of rules which dictate behavior of the respective radio transceivers based on the high or low assertions of the single bit data means, transmissions from one transceiver which conflict with the transmission or reception of the other transceiver can be avoided.

The '2-wire' coexistence scheme, as shown in FIG. 1, is the simplest common coexistence signaling scheme, and uses two wires most commonly called WLAN_Active and BT_Priority respectively:

BT_Priority (3) is asserted by the Bluetooth radio whenever it is receiving (or optionally when transmitting) a packet that it considers to be high priority. Anything other than bulk data is normally considered to be high priority; this includes device discovery, connection creation, link maintenance, and voice traffic.

WLAN_Active (4) is asserted by the IEEE 802.11 radio whenever it is receiving or transmitting. Some implementations assert this signal whenever the radio is not in power-save, but others only assert it during actual packet reception or transmission.

FIG. 2 shows a similar hardware arrangement to that shown in FIG. 1. However, in FIG. 2, transceiver 1 and transceiver 2 are connected using a '3-wire' coexistence scheme (or '4-wire' if BT_InBand is implemented). This consists of three single bit data signaling means 10, 11, and 12 (and 13 if you include the BT_InBand data signaling means), which allow transceivers 1 and 2 to exchange data regarding their respective next or current transmission and reception activities. As per the '2-wire' scheme, by enforcing a set of rules which dictate behavior of the respective radio transceivers based on transitions and levels of the data means, transmissions from one transceiver which conflict with the transmission or reception of the other transceiver can be avoided.

The '3-wire' coexistence scheme, as shown in FIG. 2, is the most common coexistence signaling scheme and comprises an IEEE 802.11 radio and a Bluetooth radio, and uses three wires, which will be called here BT_Active, BT_Status and WLAN_Active. These are occasionally supplemented by a fourth wire which will be called BT_InBand:

BT_Active (12) is asserted for Bluetooth transactions.

BT_Status (11) provides information about the priority and direction (transmit or receive) of the Bluetooth activity.

BT_InBand (13), if present, indicates whether the Bluetooth activity is on a frequency that overlaps the channel being used by the IEEE 802.11 radio.

WLAN_Active (10) is asserted by the IEEE 802.11 radio to prevent the Bluetooth radio from transmitting. Some implementations assert this continuously when the IEEE 802.11 radio is active, but others only drive it in response to BT_Active being asserted.

UWB Transmit and Receive Activity

There are two main types of activity according to the UWB protocol that benefit from protection from interference from another transceiver using a different protocol:

Beacons—Every 65 ms there is a beacon that is composed of transmissions from all devices in the UWB network. These may vary in length from 0.2 ms to >20 ms depending on the number of devices in the network. If three successive beacons are not received by a particular device then the device will drop its connection, so it is very important that this does not occur.

Reservations—Each beacon reserves slots for particular devices to exchange data. If a device has only reserved a very few slots then it is important that the device gets to use those particular slots otherwise no data transfer will occur. This method is formally referred to as Distributed Reservation Protocol (DRP). Another method is known as Prioritized Contention Access (PCA). The PCA approach allows any device to content for access to the medium (in a similar manner to IEEE 802.11) whenever it has not been reserved, but this is less efficient (the radios have to remain active) and this mode is not used by systems such as Wireless USB.

SUMMARY

Roughly described, according to one aspect of the invention there is provided a first radio configured to operate according to a first protocol and configured to use a coexistence signaling scheme with a second radio configured to operate according to a second protocol, wherein the coexistence signaling scheme is configured to allow a radio configured to operate according to the second protocol to be co-located and non-interfering with a radio configured to operate according to a protocol different to the first protocol, and wherein the first radio comprises behavioral logic for generating messages for the second radio in accordance with the coexistence signaling scheme to cause the second radio to adopt behavior suitable for coexistence with the first radio.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In the UWB protocol, both the beacons and reservations involve both transmit and receive activity, but it is the receive operations that most benefit from protection. The transmit activity can still occur whilst the other protocol is being used to transmit as the transmit signal is strong enough to differentiate itself from the interference at the receiver. However, the receiving activity will be drowned in interference if it occurs as the other protocol is being used to transmit. For coexistence purposes, both the beacons and reservations should be treated as high priority Bluetooth receive activities. The UWB transmitter will have little measurable effect on the IEEE 802.11 receiver (less than 1 dB increase in its noise floor).

Transmission of UWB signals occurs in bursts (e.g. packets) and some periodicity can be expected in the timing of those bursts.

Described herein are several coexistence schemes. These include the 2-wire signaling and 3-wire signaling systems as previously used for coexistence between, for example, an IEEE 802.11 radio and a Bluetooth radio. Each coexistence scheme is described above in relation to IEEE 802.11 and Bluetooth coexistence, and then the adaptation of the coexistence scheme for use with the UWB protocol is then described below.

Each signaling system comprises an IEEE 802.11 radio and a Bluetooth or UWB radio. The radios are interconnected with 2 or 3 coexistence signaling wires which are used to co-ordinate transmit/receive traffic for each radio.

Figure 1:
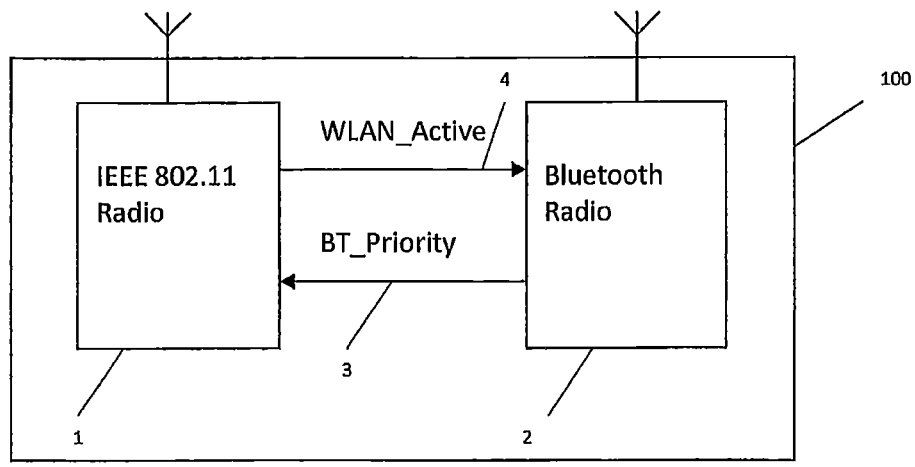
FIG. 1 illustrates a 2-wire coexistence scheme for IEEE 802.11 and Bluetooth.
Figure 3:
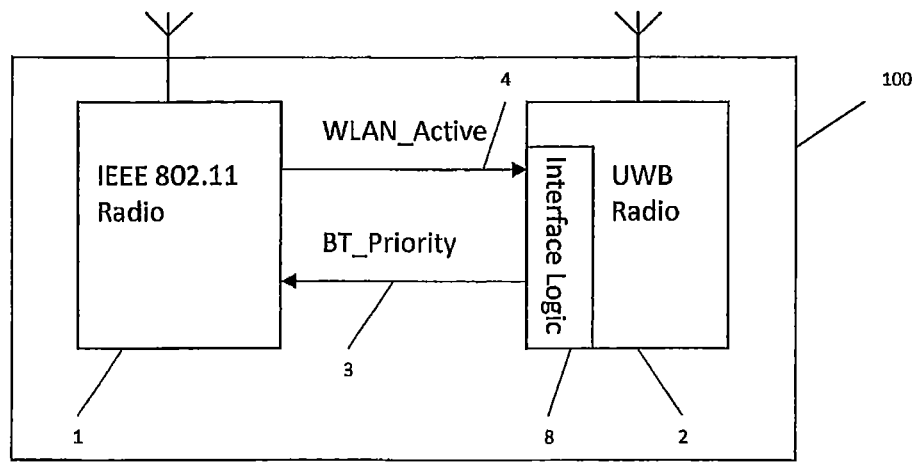
FIG. 3 illustrates a 2-wire coexistence scheme for IEEE 802.11 and UWB.

An embodiment of the present invention is shown in FIG. 3. FIG. 3 illustrates a similar arrangement to that of FIG. 1, in that it makes use of the 2-Wire coexistence scheme. However, in FIG. 3, transceiver 2 uses the UWB protocol rather than the Bluetooth protocol. Although the coexistence signaling scheme is the same as that of FIG. 1, an extra layer of interface logic (8) is implemented to allow the UWB transceiver to use the coexistence signaling scheme otherwise designed for a Bluetooth transceiver. In order to benefit from the 2-Wire coexistence scheme, the UWB radio implements the following behaviour:

Assert BT_Priority for the period for which the transceiver 2 expects to receive a UWB beacon.

Assert BT_Priority for the period for which the transceiver 2 expects to receive the first number of UWB reservations. The number of reservations to protect would be a trade-off between UWB and IEEE 802.11 throughput. Protecting all reservations would give the best UWB performance but would prevent most IEEE 802.11 activity. On the other hand not protecting any reservations would leave the IEEE 802.11 system to operate almost normally but there would be little or no UWB data transferred. The choice of how many reservations to protect would preferably be made based on the application requirements for performance of the two radios.

If the WLAN_Active is asserted by the transceiver 1, block UWB transmissions by transceiver 2 and force the transceiver 2 to restrict use to channel 1 to receive while waiting for a UWB preamble. If the transceiver 1 is active then the chances are that the transceiver 2 will not be able to receive on bands 2 and 3. Sitting on band 1 will maximise the chance of being able to receive the packet preamble when the timing of frequency hops for a particular channel are not accurately known, e.g. when searching for a beacon group to join. It is only appropriate to prevent transmissions and restrict the receiver to channel 1 when USB is operating on Band Group 1 with the IEEE 802.11 on a 4.9 GHz or low 5 GHz channel.

In one embodiment, UWB transmissions by the transceiver 2 are not blocked for small numbers of UWB reservations transmissions or beacons transmissions. In most systems the UWB transmitter will not have a significant effect on the IEEE 802.11 receiver, and so in one embodiment, the UWB transmitter is never blocked.

Additionally, if the transceiver 2 is operating on Band Group 1 (3432-4488 MHz) then it is useful for it to know when transceiver 1 (using the IEEE 802.11a/j protocol) is transmitting so that it can stay on channel 1 to maximise its chances of receiving a preamble. Preferably, this is conditional upon the combination of channels used by both the IEEE 802.11 and UWB transceivers, and the relative signal strengths of the desired signal from the peer and the local interferer.

Figure 2:
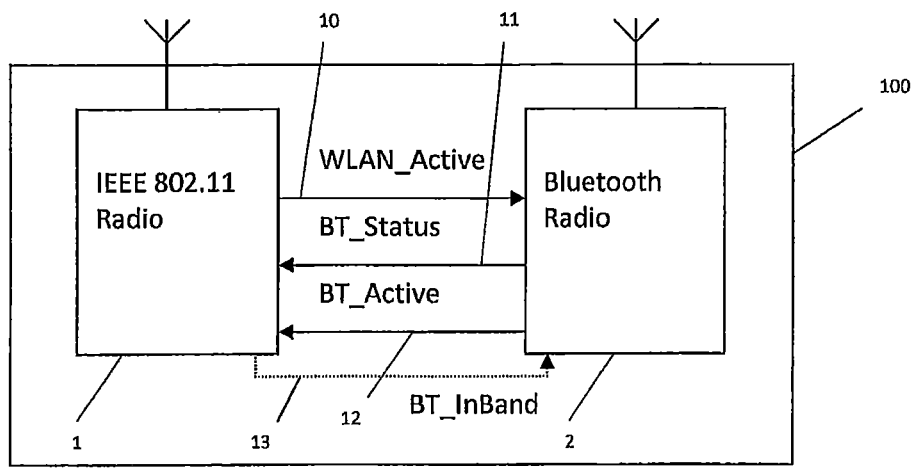
FIG. 2 illustrates a 3-wire coexistence scheme for IEEE 802.11 and Bluetooth.
Figure 4:
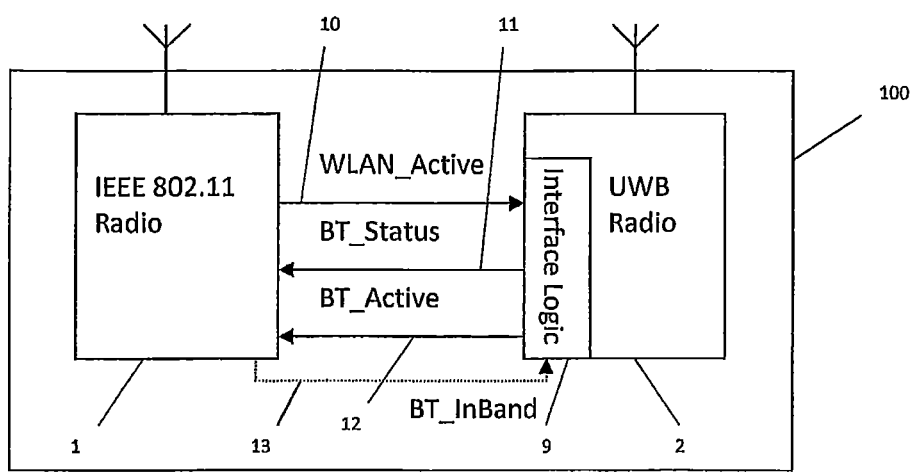
FIG. 4 illustrates a 3-wire coexistence scheme for IEEE 802.11 and UWB.

A similar arrangement to that of FIG. 2 is shown in FIG. 4 in that it makes use of a 3-Wire coexistence scheme. In FIG. 4, transceiver 2 is configured to use the UWB protocol rather than the Bluetooth protocol and implements a 3-Wire interface logic (9).

There is an implicit assumption in the known 3-Wire signaling scheme that all Bluetooth activity has durations that are exact multiples of the Bluetooth slot length (625 µs). This results in a less than perfect adaptation of the signaling scheme for UWB transceivers, as UWB transmit and receive activity is much shorter than a Bluetooth slot, so it is not possible to accurately reflect the UWB activity using the Bluetooth coexistence hardware. However, since UWB transmissions are expected to have negligible impact on IEEE 802.11 performance, it is sufficient to indicate all activity as high priority receive.

One problem is how to get an indication that the IEEE 802.11 radio is transmitting (or even generally active) if the WLAN_Active signal is only driven in response to BT_Active being asserted. An approximation could be obtained by issuing repeated low priority requests, relying on a deny response to indicate that the IEEE 802.11 radio is active. This would cause some IEEE 802.11 behavior to be blocked (if considered less important than a low-priority Bluetooth operation), which may not be desirable. Each request would need to be issued for approximately the duration of a Bluetooth slot, but ensuring that they do not overlap the higher priority activity/requests described above.

Therefore, in the embodiment of the present invention shown in FIG. 3, the interface logic asserts the following behavior for transceiver 2:

Assert BT_Active a preset length of time prior to the start of all UWB activity. For activity other than beacons, de-assert it a preset length of time before a beacon (allowing a separate request to be issued for the beacon). Otherwise, de-assert it one Bluetooth slot period length after the activity started, or when the activity has finished. Activity is signalled for a multiple of the Bluetooth slot length and so protecting adjacent reservations becomes is significant. This allows the UWB radio to receive data during the beacon or reservation time slots uninterrupted by interference from transmissions from the IEEE 802.11 radio.

For the period in which transceiver 2 expects to receive a UWB beacon or a small number of UWB reservations, signal the activity as high-priority on the BT_Status line. For all other UWB activity, signal transceiver 2 activity as low-priority on the BT_Status line. The BT_Status line should always indicate that transceiver 2 activity is receive since that is most susceptible to interference from the IEEE 802.11 radio.

Preferably block transmission by transceiver 2 (other than for UWB beacon transmissions and for small numbers of UWB reservation transmissions) and preferably force use of channel 1 while waiting for a preamble if WLAN_Active is asserted.

In an embodiment using BT_InBand, BT_InBand is asserted at the same time as BT_Active when using a Band Group that is predicted to be subject to interference from the current IEEE 802.11 channel.

An advantage of the present invention is that existing IEEE 802.11 radio and Bluetooth coexistence hardware can be easily adapted to provide coexistence for IEEE 802.11 radio and UWB. In fact, no alterations need be made to the existing hardware as the UWB radio of the present invention is capable of responding to the signals of the existing 2/3-wire schemes in a way which allows successful UWB and IEEE 802.11 radio coexistence.

Making use of the existing Bluetooth-IEEE 802.11 signaling avoids the need to get a new signaling scheme designed and adopted, and avoids needing to implement a second coexistence interface on IEEE 802.11 chips (many of which are already constrained in the amount of I/O that they can support). This is especially significant when the signaling scheme is implemented in hardware within the IEEE 802.11 chipset since it would require a new design of chip to accommodate UWB. Similar issues apply if the IEEE 802.11 firmware is stored in ROM.

It may be useful to communicate the channel number to determine which, if any, UWB channels are affected. This is best accomplished via the host (or application) processor that is using both radios.

It would be advantageous for the UWB transceiver to know which IEEE 802.11 band is being used. Then it would need only signal the IEEE 802.11 transceiver when it is intending to use a carrier or sub-carrier that would interfere with that IEEE 802.11 band. Similarly, an IEEE 802.11 transceiver that is UWB-aware could take advantage of knowing which UWB band is being used.

The above two paragraphs discuss essentially the same idea. The host can communicate the UWB frequency usage to the IEEE 802.11 transceiver, and it can also communicate the IEEE 802.11 frequency usage to the UWB transceiver. Different embodiments can employ different levels of accuracy, with the least specific being the UWB Band Group or IEEE 802.11 band (2.4 or 5 GHz), ranging through to the UWB channel (hopping sequence across bands within the Band Group) or IEEE 802.11 channel. The most important characteristic is whether IEEE 802.11 will interfere with UWB rather than the other way around.

Figure 5:
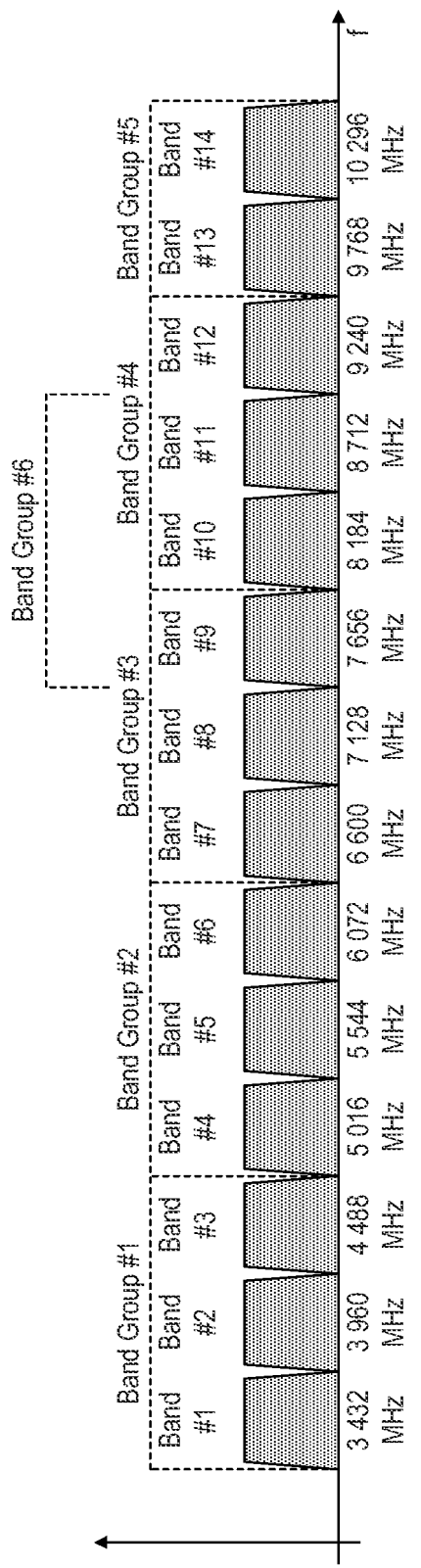
FIG. 5 illustrates a series of Band Groups defined by the UWB protocol.

FIG. 5. shows a series of Band Groups defined by the UWB protocol, each containing three bands (Band Group 5 only contains 2 bands) that the UWB radio hops between. The ideal coexistence behavior can also depend on the combination of which frequencies are being used by the two radios. For any combination of frequencies, only one of a Bluetooth transceiver or UWB transceiver will have interference problems with IEEE 802.11; Bluetooth only has interference problems with 2.4 GHz IEEE 802.11b/g. UWB Band 3 operates between 4224 and 4488 MHz which is close to the IEEE 802.11a channels starting at 5180 MHz, and even closer to IEEE 802.11j channels starting at 4920 MHz but not close to IEEE 802.11b/g. As a consequence, a UWB transceiver operating on UWB channel 3 will experience interference problems with an IEEE 802.11a/j transceiver.

Therefore, in a system incorporating a IEEE 802.11 radio, a Bluetooth radio, and a UWB radio, the Bluetooth radio and the UWB radio can share the same coexistence interface with the IEEE 802.11 radio, as they will never conflict with the IEEE 802.11 signal at the same time. In this case, the Bluetooth radio and the UWB radio would need to be told whether IEEE 802.11b/g or IEEE 802.11a/j is active. Therefore, Bluetooth coexistence is required at 2.4 GHz and only UWB coexistence is required at 5 GHz.

In one embodiment of the present invention, an IEEE 802.11 transceiver having several modes of operation is connected to a transceiver pair by a coexistence signaling means. The transceiver pair comprises a Bluetooth transceiver and a UWB transceiver. The coexistence signaling means comprises several single bit data means, which allow the IEEE 802.11 transceiver to exchange coexistence data with either the Bluetooth transceiver or the UWB transceiver regarding their respective planned transmission and reception activities. Whether the data means are routed to the Bluetooth transceiver or the UWB transceiver is determined by the operating mode of the IEEE 802.11 transceiver. For example, if the IEEE 802.11 transceiver is operating in IEEE 802.11b/g mode, then the coexistence data is routed between the IEEE 802.11 transceiver and the Bluetooth transceiver, so that they can co-ordinate to not interfere with one another (whilst the UWB radio interferes with neither). If the IEEE 802.11 transceiver is operating in IEEE 802.11a/j mode, then the coexistence data is routed between the IEEE 802.11 transceiver and the UWB transceiver, so that they can coordinate to not interfere with one another (whilst the Bluetooth radio interferes with neither).

A simpler embodiment of the coexistence interface is to route the coexistence data simultaneously to the Bluetooth and UWB transceivers (with the BT_Active, BT_Status and BT_InBand signals from both transceivers OR'd together). This would result in worse performance but would not require information about the band on which the IEEE 802.11 transceiver is operating.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:
1. A device, comprising:
a first radio configured to operate according to an Ultra-wideband (UWB) protocol;
a second radio configured to operate according to an IEEE 802.11 protocol;
a coexistence signaling scheme configured to allow the second radio to be co-located and non-interfering with a third radio that is configured to operate according to a Bluetooth protocol, wherein the coexistence signaling scheme is, in of itself, inoperable with the first radio and includes a number of physical wires to transmit signals; and interface logic configured to send messages from the first radio to the second radio, the messages generated in accordance with the coexistence signaling scheme and configured to cause the second radio to operate in coexistence with the first radio, wherein the interface logic allows the coexistence signaling scheme to operate with the first radio.

2. The device of claim 1, wherein the interface logic is included within the first radio and further configured to allow the first radio and the second radio to be co-located and non-interfering.

3. The device of claim 2, wherein the coexistence signaling scheme is implemented using a 2-wire coexistence signaling arrangement, comprising:
   a first signal line configured to transmit a first signal from the first radio to the second radio, the first signal asserted based on the third radio receiving a high-priority Bluetooth packet; and
   a second signal line configured to transmit a second signal from the second radio to the first radio, the second signal asserted based on the second radio receiving or transmitting.

4. The device of claim 3, wherein the interface logic is configured to cause the first radio to:
   assert the first signal for a period during which the first radio expects to receive a UWB beacon.

5. The device of claim 3, wherein the interface logic is further configured to cause the first radio to:
   assert the first signal for a period during which the first radio expects to transmit or receive UWB reservations.

6. The device of claim 3, wherein the interface logic is further configured to cause the first radio to block UWB transmissions based on assertion of the second signal by the second radio.

7. The device of claim 3, wherein the interface logic is further configured to cause the first radio to:
   based on assertion of the second signal by the second radio, force the first radio to use channel 1 while waiting for a UWB preamble.

8. The device of claim 3, wherein the interface logic is further configured to allow the first radio to transmit transmissions when the second signal is asserted by the second radio based on the transmissions comprising UWB beacons or UWB reservations.

9. The device of claim 2, wherein the coexistence signaling scheme is implemented using a 3-wire coexistence signaling arrangement, comprising:
   a first signal line configured to transmit a first signal from the first radio to the second radio, the first signal asserted based on the third radio conducting a Bluetooth transactions;
   a second signal line configured to transmit a second signal from the first radio to the second radio, the second signal asserted to indicate whether the Bluetooth transaction is low-priority or high-priority and whether current activity is a transmit activity or a receive activity; and
   a third signal line configured to transmit a third signal from the second radio to the first radio, the third signal asserted by the second radio to prevent the third radio from transmitting.

10. The device of claim 9, wherein the interface logic is further configured to cause the first radio to:
    when performing any transmit or receive activity, assert the second signal to indicate that the receive activity is being performed by the first radio;
    for the period during which the first radio expects to receive a UWB beacon or a number of UWB reservations, assert the second signal to indicate the first radio activity as high-priority; and
    for all remaining UWB activities, assert the second signal to indicate the first radio activity as low-priority.

11. The device of claim 9, wherein the interface logic is further configured to cause the first radio to:
    assert the first signal to indicate activity by the first radio a period of time prior to a start of all activity by the first radio.

12. The device of claim 11, wherein the interface logic is further configured to cause the first radio to:
    during first radio activity which does not involve receiving UWB beacons and preceding a period during which the first radio expects to receive a UWB beacon, de-assert the first signal a period of time before a next beacon reception period; and
    otherwise, de-assert the first signal one Bluetooth slot period length after a beginning of the activity, or when the activity is finished.

13. The device of claim 9, wherein the interface logic is further configured to cause the first radio to:
    based on assertion of the third signal by the second radio to indicate activity by the second radio, other than for UWB beacon transmissions by the first radio or for a number of reservation transmissions by the first radio, block UWB transmissions by the first radio.

14. The device of claim 9, wherein the interface logic is further configured to cause the first radio to:
    based on assertion of the third signal by the second radio to indicate activity by the second radio, force the UWB radio to use channel 1 while waiting for a UWB preamble.

15. A multi-radio system comprising:
    a first radio configured to operate according to a first protocol and configured to use a shared coexistence signaling arrangement with a second radio configured to operate according to a second protocol; and
    a third radio configured to operate according to a third protocol and configured to use the shared coexistence signaling arrangement with the second radio as the second radio uses with the first radio, wherein:
       the first and second radios interfere with each other when the second radio is operating in a first mode and the second and third radios interfere with each other when the second radio is operating in a second mode;
       the shared coexistence signaling arrangement is configured to allow a radio configured to operate according to the second protocol to be co-located and non-interfering with another radio configured to operate according to the first or third protocol; and
       the first and second radios communicate coexistence data with each other via signaling wires when the second radio is operating in the first mode, and the second and third radios communicate coexistence data with each other via signaling wires when the second radio is operating in the second mode.

16. The multi-radio system of claim 15, wherein the first protocol is an Ultra-wideband protocol, the second protocol is an IEEE 802.11 protocol, and the third protocol is a Bluetooth protocol.

* * * * *